United States Patent

Paulson

[15] 3,670,565
[45] June 20, 1972

[54] CYCLE COUNTER FOR JET ENGINES

[72] Inventor: Allen E. Paulson, 3021 Airport Ave., Santa Monica, Calif. 90405

[22] Filed: July 15, 1970

[21] Appl. No.: 55,172

[52] U.S. Cl. ..............................73/117.3, 73/346, 324/181
[51] Int. Cl. ..........................................G01l 3/26, G04f 9/00
[58] Field of Search ......................324/181, 182, 186; 73/116

[56] References Cited

UNITED STATES PATENTS

| | | | |
|---|---|---|---|
| 3,362,217 | 1/1968 | Evans | 73/116 |
| 3,482,440 | 12/1969 | Curwen | 73/116 |
| 3,499,323 | 3/1970 | Sturges | 324/182 |
| 3,517,177 | 6/1970 | Crowell | 73/116 |

*Primary Examiner*—Alfred E. Smith
*Attorney*—Herzig & Walsh

[57] ABSTRACT

Apparatus for providing a representation of engine life including thermally responsive and throttle responsive switches and an indicator. Provision is made for energizing the indicator when the thermally responsive and throttle responsive switches are closed and subsequently preventing an indication from being registered on the indicator after the throttle responsive switch is opened and reclosed.

9 Claims, 3 Drawing Figures

PATENTED JUN 20 1972 3,670,565

INVENTOR
ALLEN E. PAULSON

BY Herzig + Walsh
ATTORNEYS

3,670,565

CYCLE COUNTER FOR JET ENGINES

BACKGROUND OF THE INVENTION

This invention relates to apparatus for providing an indication of engine life and particularly to an electrical apparatus which provides a representation of jet engine life.

For an engine to give satisfactory and trouble free service, it is necessary to require that maintenance procedures be carried out at regular time intervals. These time intervals are commonly expressed in terms of permissible running time of the engine and are determined in relation to the demand which in any particular case is put on the engine. If it is known that the demand put on the engine will be substantially constant or not varying beyond a typically normal level, the time intervals between maintenance procedures can be expressions of running time, the utilization part of any interval being given by the sum of the periods for which the engine has operated since the start of the time interval. This computation gives a satisfactory representation of what is commonly known as engine life, the demand placed on the engine being for all practical purposes constant so that the effect on the engine is represented satisfactorily only by the time for which the demand is applied.

However, where the demand placed upon the engine includes large and unpredictable variations, the effect on the engine cannot be accounted for simply as the running time, and compensation has to be made for the extent and duration of the variation, in assessing the engine life. Some indication of the extent to which this demand placed upon the engine varies beyond a normal operational level can be obtained by reference to the resulting variation in one or more operational parameters of the engine and a representation of engine life can be provided by monitoring at least one of the operational parameters throughout the operation of the engine.

SUMMARY OF THE INVENTION

It is a general aim of this invention to provide an electrical apparatus which provides a true indication of the time intervals at which regular engine maintenance procedure should be carried out.

It is a further object of this invention to provide an electrical apparatus which indicates when required engine maintenance procedures should be carried out by reference to an accurate operational parameter of the engine.

A collateral object of the invention is to provide an electrical apparatus for determining the time intervals between regular engine maintenance procedures which is characterized by its high efficiency and reliability in operation, and which is simple, compact and economical in construction and which can be readily installed in operational engines without extensive modification thereto.

Other objects and advantages of the invention will appear from the following description taken in conjunction with the accompanying drawings, in which.

DESCRIPTION OF THE PREFERRED EMBODIMENT

Figure 1:
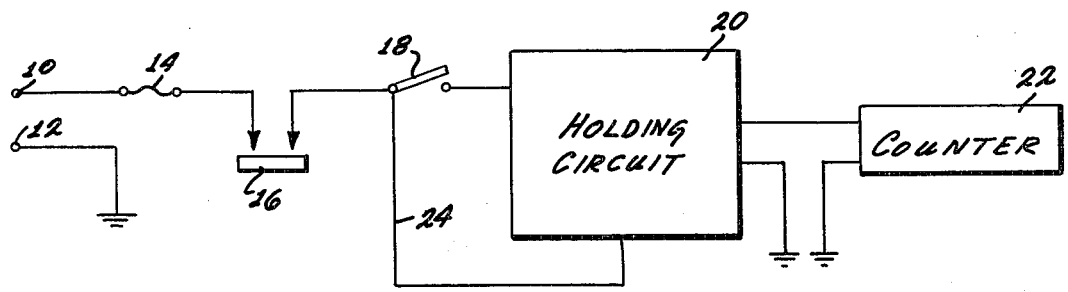
FIG. 1 is a block diagram of the electrical apparatus embodying the features of the present invention.

Referring now to FIG. 1, a block diagram of an exemplary electrical apparatus of the present invention is illustrated. In a typical environment such as in an airplane, voltage is provided at terminals 10 and 12 and may typically be 28 volts D.C. The negative D.C. voltage at terminal 12 is grounded, typically to the frame of the airplane. The positive D.C. voltage at terminal 10 passes through fuse 14 to thermoswitch 16. The thermo switch is typically mounted adjacent to or on the engine and closes after the engine has been started. Microswitch 18 is associated with the throttle of the aircraft and when the throttle is in a predetermined position, microswitch 18 closes and allows the D.C. voltage to be passed to the holding circuit 20. Immediately subsequent to the D.C. voltage being applied to the holding circuit 20, a count is registered in the counter 22 which typically is a standard digital counter. After the microswitch has been opened due to the repositioning of the aircraft throttle, D.C. voltage is provided to the holding circuit 20 from switch 18 through lead 24 and maintains the holding circuit in a condition whereby no additional counts are registered in the counter 22.

It has been determined that it is highly desirable for engines such as jet engines to be regularly serviced at intervals determined by a number of times that the engine has undergone a predetermined cycle including starting, accelerating to full power sufficient for takeoff and shutting down. Of course, once the engine has been started, there may be many accelerations typical of a takeoff condition which is 100 percent power, before the engine has been shut down again. It is therefore necessary not to count the intermediate accelerations to full power during engine usage prior to the shutdown of the engine when considering the intervals between maintenance procedures.

In accordance with the principal object of this invention the holding circuit 20 permits a count to be registered in the counter 22 upon acceleration of the engine to a takeoff position as represented by the position of the throttle and its associated microswitch 18. Once the holding circuit 20 has been energized and the engine power is backed off such that the position of the throttle causes microswitch 18 to open, lead 24 maintains the holding circuit 20 in a condition so as to prevent additional counts from being registered in the counter 22 in the event that the throttle is again advanced to a maximum position thereby closing microswitch 18.

Figure 2:
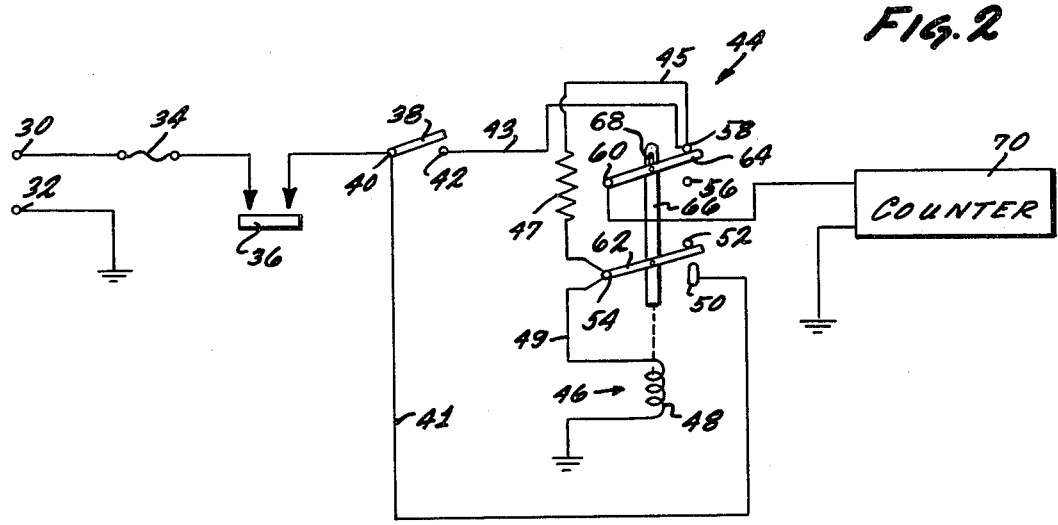
FIG. 2 is a schematic diagram of the apparatus set forth in FIG. 1.

In FIG. 2 there is shown a schematic representation of the cycle counter of the present invention. D.C. voltage is provided at terminals 30 and 32. As previously stated negative D.C. voltage at terminal 32 is grounded to the airframe. The positive D.C. voltage at terminal 30 is passed through fuse 34 and to thermoswitch 36 which closes after the engine has been started. The positive D.C. voltage is then connected to switch 38 which has terminals 40 and 42. The holding circuit is represented generally at 44 and comprises a double pole double throw relay 46 having a coil 48 and contacts 50, 52, 54, 56, 58, and 60. There are also provided relay switch contact arms 62 and 64 which are interconnected by member 66 which has a slotted aperture 68 for mounting switch arm 64.

In order to insure that only one count is registered in counter 70 while an engine is in operation, the D.C. voltage is applied at terminals 30 and 32 and is passed through thermoswitch 36 which closes when the engine is on and through switch 38 which closes when the throttle is advanced to full power. At this time, the D.C. voltage is connected from switch 38 through lead 43 to switch contact 58. In the normal position of relay 46, switch arm 64 normally connects contacts 58 and 60. Therefore, a count is immediately registered in the counter 70.

To energize the relay 46, current is simultaneously passed through lead 45 and resistor 47 to relay coil 48. This allows switch arm 64 to connect switch contact 60 to switch contact 56 and also allows switch arm 62 to connect switch contact 54 to switch contact 50. Due to the relationship of switch contact 50 with relation to switch contact 52, connection is made between switch contacts 54 and 50 before connection is broken between switch contacts 60 and 58. This causes the relay coil to be energized through lead 49, contact 54, switch arm 62, contact 50, and lead 41 to the source of D.C. power. In this event, when the microswitch 38 associated with the throttle switch is opened, power is still supplied to the relay coil 48 via the path already discussed and no new count is registered since counter 70 is no longer connected to a source of power.

It can be seen that when the relay coil 48 is energized initially, the movable member 66 causes the rotation of switch arms 62 and 64. Due to the presence of slot 68, switch arm 64 is not rotated as soon as switch arm 62. In this manner, it is also insured that contact 54 will engage contact 50 prior to the disengagement of contact 60 from contact 58.

It is further contemplated that the time delay in the relay can be accomplished by other mechanical means such as by different springs or by electrical means such as by metallic contacts and an appropriate heater.

Figure 3:
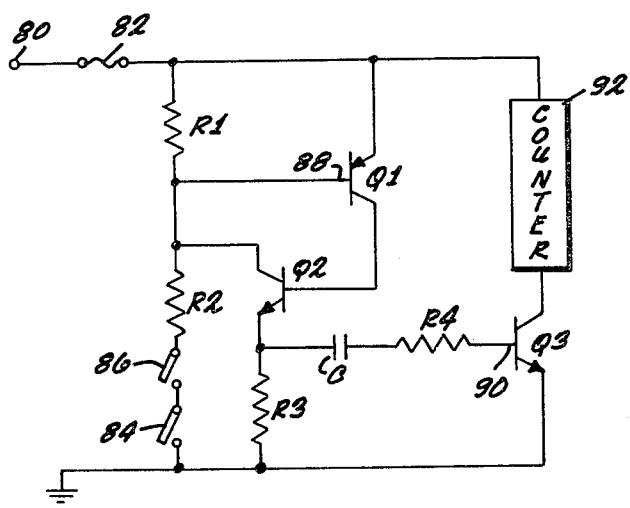
FIG. 3 is a schematic diagram of an alternative embodiment of the present invention.

Those skilled in the art will realize the desirability of having a solid state switching arrangement for energizing the counter which indicates that the engine has been accelerated to full power sufficient for takeoff. Accordingly, in FIG. 3 disengagement of illustrated a solid state switching arrangement for accomplishing this purpose.

Positive D.C. voltage is introduced at terminal 80 and passes through fuse 82. This voltage passes through resistor R1 and maintains transistor Q1 in a de-energized state. After the engine has been started thermoswitch 84 is closed. Subsequently when power sufficient for takeoff has been applied to the engine microswitch 86 which is associated with the throttle control is also closed. This causes the voltage on the base 88 of the transistor Q1 to be reduced to a point very close to the ground potential which allows the energization of transistor Q1 which in turn permits the energization of transistor Q2 which now causes a pulse to be passed through a timing network comprised of capacitor C and the resistor R4, to the base 90 of transistor Q3.

It will be readily apparent that after transistor Q3 has been energized current flows through the counter from the positive D.C. voltage to ground through transistor Q3, for the interval of time that transistor Q3 is energized as predetermined by the timing network. In this manner a count will be registered in the counter 92.

In order to insure that a further count is not recorded in the counter 92 after the throttle microswitch 86 has been opened it will be seen that the energization of transistor Q2 maintains the base 88 of the transistor Q1 at a voltage very close to ground potential. This energization of transistor Q2 thus causes transistor Q1 to remain energized which in turn keeps transistor Q2 energized. Inasmuch as transistor Q2 now remains energized through the entire operation sequence, no further pulse is formed at the base of Q3 through the timing network comprised of capacitor C and resistor R4, and the counter 92 is not re-energized at any time.

To obtain a new registration in the counter it is necessary that the engine and airplane power be shut down completely in order to disconnect power from the circuitry thereby causing the de-energization of transistor Q2 which in turn causes de-energization of transistor Q1. In order to obtain a new pulse in the counter 92 it is necessary to start up the engine and connect power to the circuitry as heretofore discussed.

From the foregoing, those skilled in the art will readily observe and understand the nature and construction of the invention and the method and the manner in which the invention achieves and realizes all the objects and aims as set forth in the foregoing, as well as the many additional advantages that are apparent from the detailed description.

The foregoing disclosure is representative of a preferred embodiment of the invention and is to be interpreted in an illustrative rather than the limiting sense, the invention to be accorded full scope of the claims appended hereto.

What is claimed is:

1. Apparatus for providing a representation of engine life comprising; thermally responsive switch means having an open and closed position; throttle responsive switch means having an open and closed position; indicator means; and control means for energizing said indicator means when said thermally responsive switch and said throttle responsive switch are closed, said control means being constructed to prevent an indication from being registered on said indicator means after said throttle responsive switch is opened and re-closed.

2. Apparatus according to claim 1, wherein said control means comprises a relay means.

3. Apparatus according to claim 2, wherein said control means includes a holding circuit for said relay means.

4. Apparatus according to claim 3, wherein said control means includes time delay means for interrupting a circuit to the indicator means after completing the holding circuit.

5. Apparatus according to claim 2 wherein said relay means is a double pole throw type wherein one set of contacts makes before the other set of contacts breaks so as to maintain energization of said relay when said throttle responsive switch means is opened.

6. Apparatus according to claim 1 embodying circuit means includes first switch means, second switch means, and third switch means, wherein closing of said thermally responsive switch and said throttle responsive switch energizes said first switch means thereby energizing said second switch means and allowing the energization of said third switch means thereby energizing said counting means.

7. Apparatus according to claim 6 wherein said first switch means, said second switch means and said third switch means are transistors.

8. Apparatus according to claim 1 wherein said indicator means is a counter.

9. Apparatus as in claim 4, wherein said time delay means comprises a member movable by the relay and lost motion connections between said member and the interrupting means.

* * * * *